(12) United States Patent  (10) Patent No.: US 8,521,511 B2
Balchandran et al.  (45) Date of Patent: Aug. 27, 2013

(54) INFORMATION EXTRACTION IN A NATURAL LANGUAGE UNDERSTANDING SYSTEM

(75) Inventors: Rajesh Balchandran, Congers, NY (US); Linda M. Boyer, Ossining, NY (US); Gregory Purdy, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 1386 days.

(21) Appl. No.: 11/764,294

(22) Filed: Jun. 18, 2007

(65) Prior Publication Data

US 2008/0310718 A1  Dec. 18, 2008

(51) Int. Cl.
*G06F 17/27* (2006.01)

(52) U.S. Cl.
USPC .......................................................... 704/9

(58) Field of Classification Search
None
See application file for complete search history.

(56) References Cited

U.S. PATENT DOCUMENTS

| | | | |
|---|---|---|---|
| 5,477,451 A | 12/1995 | Brown et al. | |
| 5,625,748 A | 4/1997 | McDonough et al. | |
| 5,675,706 A | 10/1997 | Lee et al. | |
| 6,311,152 B1 | 10/2001 | Bai et al. | |
| 6,609,087 B1 | 8/2003 | Miller et al. | |
| 6,615,172 B1 | 9/2003 | Bennett et al. | |
| 6,732,090 B2 | 5/2004 | Shanahan | |
| 6,816,858 B1 * | 11/2004 | Coden et al. ............... | 707/750 |
| 6,931,351 B2 | 8/2005 | Verma et al. | |
| 7,275,033 B1 | 9/2007 | Zhao | |
| 7,509,578 B2 | 3/2009 | Rujan et al. | |
| 7,606,700 B2 * | 10/2009 | Ramsey et al. ............... | 704/9 |
| 2002/0002450 A1 | 1/2002 | Nunberg | |
| 2002/0099730 A1 | 7/2002 | Brown et al. | |
| 2002/0123891 A1 | 9/2002 | Epstein | |
| 2002/0196679 A1 * | 12/2002 | Lavi et al. .................... | 365/200 |
| 2003/0130841 A1 * | 7/2003 | Bangalore et al. ........... | 704/231 |
| 2003/0191625 A1 | 10/2003 | Gorin et al. | |
| 2004/0148170 A1 * | 7/2004 | Acero et al. ................. | 704/257 |
| 2004/0243408 A1 * | 12/2004 | Gao et al. ..................... | 704/240 |
| 2005/0075878 A1 | 4/2005 | Balchandran et al. | |
| 2007/0106496 A1 * | 5/2007 | Ramsey et al. ............... | 704/9 |
| 2007/0124134 A1 | 5/2007 | Van Kommer | |
| 2008/0208567 A1 | 8/2008 | Brockett et al. | |
| 2008/0312904 A1 | 12/2008 | Balchandran et al. | |
| 2008/0312905 A1 | 12/2008 | Balchandran et al. | |
| 2008/0312906 A1 | 12/2008 | Balchandran et al. | |
| 2010/0100380 A1 * | 4/2010 | Tur .............................. | 704/244 |

OTHER PUBLICATIONS

Gupta et al., "The AT&T Spoken Language Understanding System", IEEE Transactions on Audio, Speech, and Language Processing, vol. 14, No. 1, Jan. 2006.*
"The AT&T Spoken Language Understanding System," IEEE Trans. On Audio, Speech & Language Processing, vol. 14, No. 1, Jan. 2006.

* cited by examiner

*Primary Examiner* — Brian Albertalli

(74) *Attorney, Agent, or Firm* — Cuenot, Forsythe & Kim, LLC

(57) ABSTRACT

A method of extracting information from text within a natural language understanding system can include processing a text input through at least one statistical model for each of a plurality of features to be extracted from the text input. For each feature, at least one value can be determined, at least in part, using the statistical model associated with the feature. One value for each feature can be combined to create a complex information target. The complex information target can be output.

14 Claims, 2 Drawing Sheets

INFORMATION EXTRACTION IN A NATURAL LANGUAGE UNDERSTANDING SYSTEM

BACKGROUND OF THE INVENTION

Natural language understanding (NLU) refers to the technology that allows computers to understand, or derive meaning from, human languages. In general, NLU systems determine meaning from text. The text can be derived from any of a variety of sources, e.g., speech recognized text, keyboard entry, or the like. The meaning of the text can be determined and provided to other systems.

Some NLU systems determine meaning from text through a process that extracts information from the text. This process involves identifying features within the text as well as determining values for those features. Consider the text input "I want to order call forwarding for my home phone." Determining the meaning of this text input can involve identifying three features including an intent feature, a service feature, and a context feature.

In this example, the value of the intent feature is "place order." Other examples of potential values for the intent feature can include "cancelling a service," "paying a bill," or the like. The service feature is "call forwarding" and is the item that is being ordered. Other values for the service feature can include caller ID, voicemail, etc. The context feature is "home phone," which identifies the particular account or context to which the service is being ordered. Determining values for each of these features can convey the meaning of the text input.

An NLU system that must extract information for even a small number of features still must be able to distinguish between a significant number of possible feature-value combinations. Consider an NLU system configured to identify and determine values for four features A, B, C, and D. Assume that feature A can take on any one of five values, feature B can take on any one of 10 values, feature C can take on any one of 20 values, and feature D can take on any one of 300 values. This leads to 5×10×20×300=300,000 possible combinations of values. Each combination of values can be referred to as a complex information target. Each complex information target indicates a particular meaning for text.

Often, many, if not all, of the features are independent of one another. This independence is demonstrated by the situation described above in which 300,000 possible complex information targets exist within the NLU system. Another attribute of independence is that not all features may be present in a given text input, which can complicate meaning determination.

One conventional approach to determining meaning from text within an NLU system is to build a statistical model that is trained on training data including text that is classified according to the total number of potential complex information targets. With respect to the example including features A, B, C, and D, each item of the training data would be classified into one of the 300,000 potential complex information targets. While the total number of complex information targets can, in some cases, be reduced, the number of complex information targets within a system even after target reduction still can number in the thousands.

The ability of a statistical model to accurately determine meaning, e.g., determine a correct complex information target for a given text input, decreases as the number of complex information targets within the NLU system increases. With larger numbers of complex information targets, overlap in meaning may also occur between different complex information targets, which further can reduce NLU system accuracy.

BRIEF SUMMARY OF THE INVENTION

The present invention relates to natural language understanding (NLU) systems. One embodiment of the present invention can include a method of extracting information from text within an NLU system. The method can include processing a text input through at least one statistical model for each of a plurality of features to be extracted from the text input. For each feature, at least one value can be determined, at least in part, using the statistical model associated with the feature. One value for each feature can be combined to create a complex information target. The complex information target can be output.

Another embodiment of the present invention can include a method of extracting information from text within an NLU system including determining a value for a first feature using a selected text processing technique and selecting a statistical model from a plurality of statistical models associated with a second feature according to the value determined for the first feature. A value for the second feature can be determined using the selected statistical model. The values for the first feature and the second feature can be combined to form a complex information target. The information target can be output.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

Figure 1:
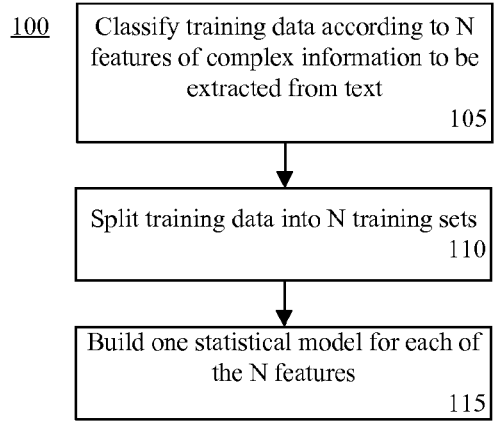
FIG. 1 is a flow chart illustrating a method of generating statistical models in accordance with one embodiment of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, an optical storage medium, such as an optical disk including a compact disk—read only memory (CD-ROM), a compact disk—read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The embodiments disclosed herein relate to natural language understanding (NLU) and to the extraction of information from text. A portion of text can be processed by applying a plurality of different statistical models to the text. Each statistical model can be built for, or associated with, a particular feature that is to be extracted from the text. Results from applying each statistical model to the text can be combined into a complex information target which can be output. As used herein, "outputting" or "output" can include, but is not limited to, writing to a file, writing to a user display or other output device, playing audible notifications, sending or transmitting to another system, exporting, or the like.

One or more other processes for feature extraction optionally can be applied to the text as well. For example, the text can be processed using regular expressions to extract named entities and/or one or more optimized statistical models. Results also can be optionally pruned to remove results that are not valid for a given domain. A weighted mapping technique further can be applied, if desired, which selectively maps one complex information target to another in an effort to increase the accuracy of the NLU system. The resulting complex information target is indicative of the meaning of the text and can be output to one or more other systems and/or applications.

FIG. 1 is a flow chart illustrating a method 100 of generating statistical models in accordance with one embodiment of the present invention. The method 100 can be performed to create a plurality of statistical models that can be applied to text to perform feature extraction within an NLU system. The method 100 can begin in a state in which an NLU system includes a particular number of features that can be extracted from text, e.g., "N" features. Each of these N features may have one or more possible values and the number of values for each feature can vary.

In step 105, training data can be classified according to the N features of complex information that can be extracted by the NLU system. For example, each sentence of the training data can be associated with one or more features that are represented within that sentence. The term "sentence," as used herein, refers to a portion of text such as a grammatically correct sentence, a grammatically incorrect sentence, a fragment or part of a sentence, or any other portion or unit of text, e.g., a text string. The classification for a sentence further can specify the particular values indicated or taken on by each feature represented in the sentence.

For example, a sentence of training data such as "I want to order call forwarding for my work phone" can specify three features and a value for each of the three features. The three features can be "intent," "service," and "context." The classification for the sentence can indicate the three features included in the sentence as well as a value for each feature. Thus, the intent feature can be assigned a value such as "order service." The service feature can be assigned a value such as "call forwarding." The context feature can be assigned a value such as "work phone."

It should be appreciated that the set of features included in the sentence may be less than the number of features N that can be handled by the NLU system. For example, a sentence of training data such as "I want to order call forwarding" specifies a value of "place order" for the feature "intent" and a value of "call forwarding" for the feature "service," but does not specify anything for the feature "context." In some cases, the presence of a given feature A has no relation to whether the sentence will include another feature B. In this regard, the features can be said to be independent of one another. Still, it should be appreciated that one or more features may not be completely independent. For example, if a feature such as "month" is determined to have a value of "April," the day feature can be limited to values of 1-30 rather than 1-31.

In step 110, the training data can be split or grouped into N different training sets, e.g., one per feature. Since each sentence of the training data may represent more than one feature, each sentence of the training data may be included within more than one of the N groups of training data. For example, the sentence "I want to order call forwarding for my work phone" can be assigned into a group of training data for the intent feature, another group of training data for the service feature, and another group for the context feature.

In step 115, a statistical model can be built for each feature of the NLU system. Thus, each feature will have a corresponding statistical model. Each statistical model for each feature can be built from the group of training data associated with that feature. Any of a variety of known statistical model generation and/or training techniques can be used including, but not limited to, maximum likelihood, maximum entropy, or the like. Thus, the statistical model for the intent feature can be built from the group of sentences corresponding to, or classified as including, the intent feature. The NLU system will include at least one statistical model for each feature that the NLU system is to extract from text.

Another technique for feature extraction can utilize named entities. A named entity, in general, refers to a place holder for a particular feature or piece of information. Examples of named entities can include service names, product names, city names, proper names, etc. Each named entity is associated with a list or grammar of possible phrases. For example, a service named entity can be associated with a list of phrases such as "call forwarding," "call waiting," "caller ID," "voicemail," or the like.

Named entity phrases within training data can be used to construct grammars, regular expressions, or statistical models. At runtime of the NLU system, the grammars, regular expressions, and/or statistical models can be used to search a received text input for named entities. If a named entity is present, the identified phrase can be used to determine a value for the feature of the NLU system that has been associated with that named entity.

In illustration, if the text input "I would like to order call forwarding" is received, the phrase "call forwarding" can be identified as a named entity phrase. The named entity phrase can be associated with the service feature and indicate a value of "call forwarding." Similarly, within a text input such as "I would like to forward my calls," the phrase "forward my calls" can be identified as a named entity phrase that is associated with the service feature. The phrase "forward my calls" can indicate a value of "call forwarding."

Figure 2:
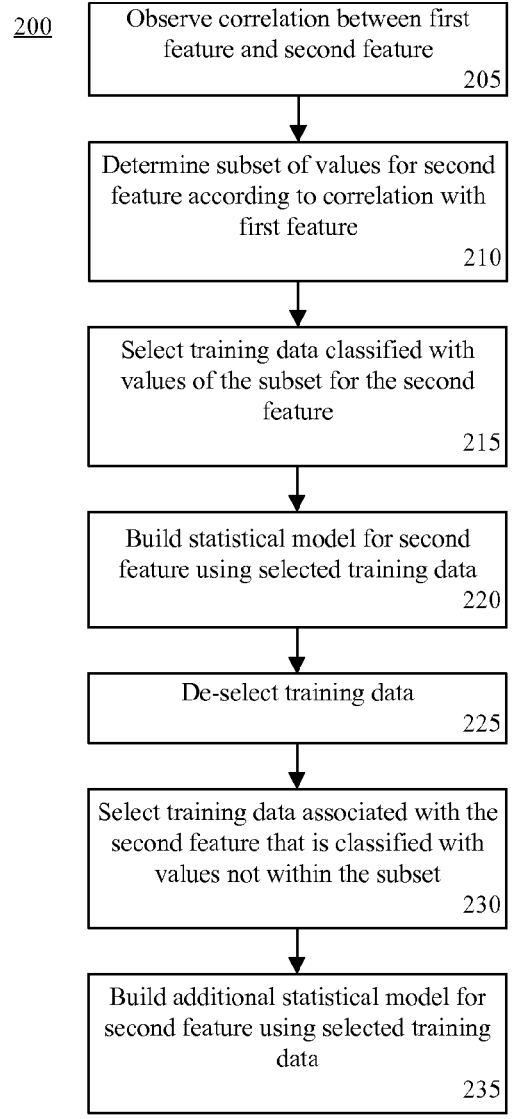
FIG. 2 is a flow chart illustrating a method of generating statistical models in accordance with another embodiment of the present invention.

FIG. 2 is a flow chart illustrating a method 200 of generating statistical models in accordance with another embodiment of the present invention. The method 200 can be used to generate optimized statistical models based upon observed correlations between one or more features to be extracted from text. A simple example of a correlation can include the case in which a first feature corresponds to a month and a second feature corresponds to a date. The value determined for the month, e.g., January, February, March, etc., will influence the possible values for the date simply due to the fact that all months do not have the same number of days.

Another example of a correlation can be the case where an NLU system is functioning within an automobile and is interpreting speech recognized text. A first feature, e.g., an automobile system feature, may relate to a particular system that the driver is attempting to access. That feature, e.g., an automobile system feature, may have potential values of "radio" or "climate control," among others. A second feature, such as a system parameter feature, with a value relating to the temperature setting of the climate control is only relevant if the automobile system feature is determined to have a value of "climate control" and not "radio."

Accordingly, in step 205, a correlation can be observed between a first feature and at least a second feature. In step 210, a subset of values for the second feature can be determined according to the observed correlation with the first feature. For example, consider an NLU system having a first feature F1 with a total of ten potential values which, for purposes of illustration, can be represented as a numerical range of 1-10 and a second feature of F2 having a potential range of ten different values represented, for purposes of illustration only, as values 1-10. A correlation can be observed that when feature F1 takes on a value of 1, 5, or 9, represented as $F1_1$, $F1_5$, or $F1_9$, feature F2 takes on values of only $F2_3$, $F2_7$, $F2_8$, or $F2_{10}$. Thus, the subset of values for F2 is $\{3, 7, 8, 10\}$.

In step 215, the training data associated with the subset of values can be selected. For example, each sentence that has been classified as including feature F2 with a value of 3, 7, 8, or 10 can be selected. In step 220, a statistical model can be built for feature F2 using only the selected training data. The statistical model for F2 is trained using only the data classified as including $F2_3$, $F2_7$, $F2_8$, or $F2_{10}$.

In step 225, the selected training data can be deselected. In step 230, the training data associated with the second feature that was not included within the subset identified in block 210 can be selected. For example, each sentence of the training data including values for F2 of $F2_1$, $F2_2$, $F2_4$, $F2_5$, $F2_6$, $F2_9$, or $F2_{10}$ can be selected. In step 235, an additional statistical model for feature F2 can be built using the selected training data. Accordingly, feature F2 will have two statistical models. One statistical model can be applied to determine a value for feature F2 when a value of 1, 5, or 9 is determined for feature F1. The other statistical model for feature F2 can be applied when a value other than 1, 5, or 9 is determined for feature F1.

It should be appreciated that correlations can be observed between two or more features. Further, though the method 200 is described with reference to a single pair of features, the method 200 can be repeated as may be required to generate further statistical models for further observed correlations between different groupings of features. In addition, the training data can be split into more than two groups for a given feature, thereby resulting in the creation of more than two optimized statistical models for a single feature.

As described, a variety of techniques can be used to determine information from text. One or more techniques also can be used to verify the accuracy of the information that is determined. In one embodiment, results known to be inaccurate can be pruned. For example, a list of allowable or acceptable complex information targets can be determined. As discussed, though many features may be completely independent of one another, one or more features may be correlated in some fashion.

As noted with respect to the automobile climate control and radio example, one can determine that any complex information targets that specify a value of "radio" for the automobile system feature should not specify values for the system parameter feature that are unrelated to the domain of the radio. For example, a value for the system parameter feature relating to the climate control system within such a complex information target can be determined to be incorrect or not allowable. Similarly, a complex information target having a value of "climate control" for the automobile system feature should not have any values for the system parameter feature relating to the radio. Such complex information targets can be disallowed.

Accordingly, a list of allowable complex information targets can be created. The complex information targets on the list can be compared with complex information targets determined by the NLU system at runtime. When a complex information target determined by the NLU system at runtime does not match any complex information target on the list, the complex information target determined by the NLU system can be disallowed, modified, or otherwise flagged as being disallowed or incorrect.

Figure 3:
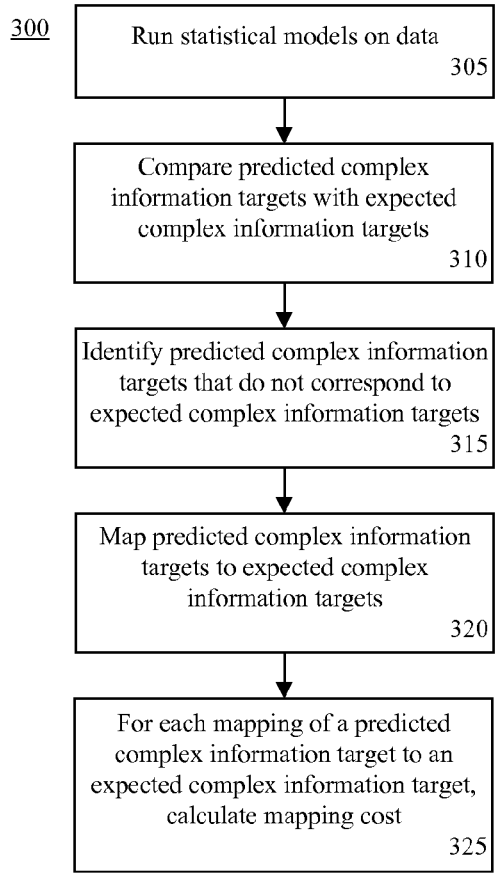
FIG. 3 is a flow chart illustrating a method of mapping predicted complex information targets to expected complex information targets in accordance with another embodiment of the present invention.

FIG. 3 is a flow chart illustrating a method 300 of mapping predicted complex information targets to expected complex information targets in accordance with another embodiment of the present invention. The method 300 can be used to determine cases where an information extraction technique is incorrect in a significant number of instances. In those instances, the complex information target, or result determined by the NLU system, can be mapped to another complex information target.

The method 300 can begin in step 305 where one or more statistical models can be run upon a set of data. The data can be test data, training data, a portion of the training data that is held out from training statistical models for testing, or any other source of text. By running the statistical models on the data, the data can be classified or annotated to indicate the particular feature(s) that may be included in each sentence of the data as well as a value for each feature found.

In step 310, predicted complex information targets can be compared with expected complex information targets. Predicted complex information targets refer to the results obtained from execution of the NLU system using one or more information extraction techniques, e.g., a runtime result. Expected complex information targets refer to the result that is expected from the NLU system, e.g., the correct complex information target. In step 315, any predicted complex information targets that do not correspond to, or match, the associated expected complex information target for a given sentence of the processed data can be identified. In step 320, each of the predicted complex information targets identified in step 315 can be mapped to the expected complex information target with which the predicted complex information target was compared, e.g., the correct complex information target.

In step 325, for each mapping of a predicted complex information target to an expected complex information target, a mapping cost can be calculated. The mapping cost, in general, indicates whether the mapping should be applied or enforced at runtime of the NLU system. For example, if 90% of the instances in which a complex information target A is determined by the NLU system, the correct complex information target is B, then enforcing a mapping of A to B will result in a correct complex information target in 9 out of 10 times in which the mapping is applied. That is, the mapping will correct more errors than are introduced since complex information target A is correct in only 1 out of 10 times.

In one embodiment, the most frequently occurring mapped pairs can be determined. For each of the most frequently occurring mapped pairs, a mapping cost can be calculated to indicate the number of times an error is fixed as opposed to the number of times the mapping will cause an error. This can be normalized by the number of sentences in the training data or held out test set. The NLU system can be configured to apply mappings that have a mapping cost indicating at least a minimum correction rate.

Figure 4:
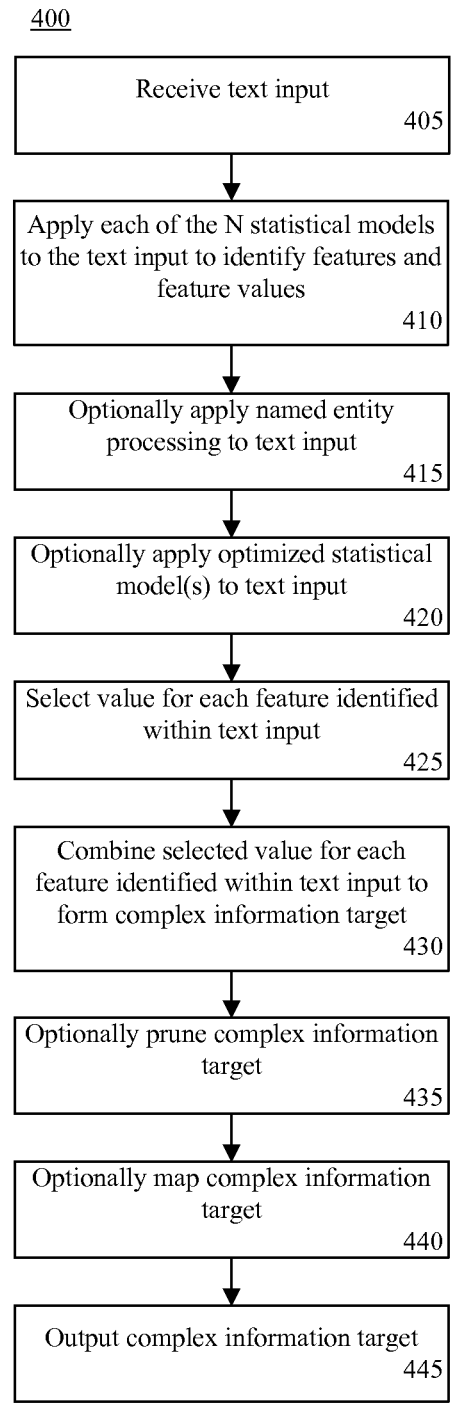
FIG. 4 is a flow chart illustrating a method of extracting information from text in accordance with another embodiment of the present invention.

FIG. 4 is a flow chart illustrating a method of determining information from text in accordance with another embodiment of the present invention. The method 400 can utilize one or more of the techniques disclosed herein. It should be appreciated that the order in which the techniques are presented in FIG. 4 is not intended to limit the embodiments disclosed herein solely to such an order. Further, one or more of the various techniques can be optionally applied.

The method 400 can begin in a state in which an NLU system is operating and text is being received and processed, e.g., a runtime method. Accordingly, in step 405, a text input can be received by the NLU system. In step 410, a statistical model associated with each of the features to be extracted from text by the NLU system can be applied to the text input. For example, if the NLU system is capable of identifying N features, at least one statistical model for each of the N features can be applied to the text input. Application of a statistical model to the text input will result in the identification of any features within the text input as well as particular values for such features.

In step 415, named entity processing optionally can be applied to the text input. In one embodiment, named entity processing can be selectively applied, e.g., when one or more feature values are not determined in block 410 and still are needed for complete determination of the meaning of the text input. In another embodiment, named entity processing can be applied for a given feature when the value determined by the statistical model for that feature has a confidence score below a given threshold. In general, a confidence score indicates the likelihood that a particular value determined or estimated for a feature is the correct value. In another embodiment, named entity processing can be applied for a given feature when the value determined by the statistical model for that feature or another feature is determined to be equal to a specific value. For example, named entity processing can be applied to determine a value for the "service" feature when the value of the "intent" feature is determined to be "place order."

In step 420, one or more optimized statistical models optionally can be applied to the text input. As noted, in cases where some correlation exists between two features, a statistical model can be selected and applied for a given feature according to a value determined for another feature. For example, assume features F1 and F2 are correlated such that the values that are possible for feature F2 are influenced by the value determined for feature F1. In that case, after determining a value for feature F1, a particular optimized statistical model for feature F2 can be selected from a plurality of optimized statistical models for feature F2 according to the value of feature F1. The selected statistical model for F2 can be applied to determine a value for feature F2. It should be appreciated that while block 420 is depicted as being after block 410, the selected statistical model can be applied for feature F2 initially, e.g., within the context of block 410, rather than after application of another generalized statistical model for feature F2.

In step 425, a value can be selected for each of the features identified within the text input. It should be appreciated that one or more or all of the statistical models, as well as the named entities, can be configured to return more than one value for a given feature. Each candidate value can be associated with a confidence score. For example, the top 5 candidate values for a feature, the top 4, the top 3, etc. can be returned. If more than one value is determined for a given feature, the value having the highest confidence score can be selected. If only a single value is determined for a feature, that value can be selected. In step 430, the selected value for each of the features identified in the text input can be combined, or grouped into a set, to form a complex information target.

In step 435, the complex information target optionally can be pruned. The complex information target determined in step 430 can be compared with a list of allowable complex information targets. The complex information target determined in step 430 can be determined to be allowable or not based upon the comparison. In one embodiment, when one or more values for features are not allowed per the list of allowable complex information targets, such values can be changed. For example, another value from a list of the candidate values for that feature can be selected. The candidate value selected can be the candidate value for the feature with the next highest confidence score. A determination can be made as to whether replacing the incorrect value with the selected candidate value results in an allowable complex information target. If so, the method can continue. If not, further candidate values can be used to replace the incorrect value according to decreasing confidence score until an allowable complex information target is determined. If no allowable complex information target is determined, the method can generate an error or select an allowable complex information target to be used in lieu of the determined, disallowed complex information target.

In step 440, the complex information target optionally can be mapped to another complex information target. As noted, the mapping can be implemented only in those cases where the mapping generates more correction results than errors. It should be appreciated that the mapping can be implemented in combination with block 435 or in the alternative to block 435. The mapping, for example, can be applied in those cases where block 435 is not successful in determining an allowable complex information target, when block 435 produces an allowable complex information target, etc.

In step 445, the resulting complex information target can be output. As noted, the complex information target conveys each feature identified within the text input as well as a value for each such feature. Accordingly, the complex information target can be said to convey the meaning of the text input and can be used by one or more other systems to invoke further processing.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A method of extracting information from text within a natural language understanding system, comprising:

parsing a text input to extract a plurality of features from the text input;

processing each of the plurality of features through a plurality of statistical models to obtain at least one value;
combining, via a processor, one value for each of the plurality of features to create a complex information target;
outputting the complex information target;
comparing the complex information target with a list of predicted complex information targets, wherein each predicted complex information target is associated with an expected complex information target; and
mapping, upon the complex information target matching a predicted complex information target, the complex information target to the expected complex information target associated with the matched predicted complex information target, wherein
the complex information target indicates a meaning for the text input.

2. The method of claim 1, wherein
the plurality of statistical models output a plurality of candidate values for a particular feature,
a value having a highest confidence score is selected, for the particular feature, from the plurality of candidate values, and
the value having the highest confidence score is the one value, for the particular feature, used to create the complex information target.

3. The method of claim 1, further comprising:
searching the text input for at least one named entity; and
determining a value for a feature according to the at least one named entity located within the text input.

4. The method of claim 1, further comprising:
determining a value for a first feature in the text input; and
selecting one of the plurality of statistical models based upon the value determined for the first feature.

5. The method of claim 4, wherein
the selected statistical model is built using a subset of the plurality of features that correspond to the determined value for the first feature.

6. The method of claim 1, further comprising:
comparing the complex information target with a plurality of allowable complex information targets; and
determining whether the complex information target is allowable according to the comparison with the plurality of allowable complex information targets.

7. The method of claim 6, further comprising,
selecting an alternate value for at least one feature of the complex information target from a plurality of candidate values based upon a confidence score.

8. The method of claim 7, wherein
the alternate value conforms to an allowable complex information target.

9. A computer program product, comprising:
a computer-readable storage having stored therein computer-usable program code that extracts information from text within a natural language understanding system, the computer-readable storage comprising:
computer-usable program code that parses a text input to extract a plurality of features from the text input;
computer-usable program code that processes each of the plurality of features through a plurality of statistical models to obtain at least one value;
computer-usable program code that combines one value for each of the plurality of features to create a complex information target;
computer-usable program code that outputs the complex information target;
computer-usable program code that compares the complex information target with a list of predicted complex information targets, wherein each predicted complex information target is associated with an expected complex information target; and
computer-usable program code that maps, upon the complex information target matching a predicted complex information target, the complex information target to the expected complex information target associated with the matched predicted complex information target, wherein
the complex information target indicates a meaning for the text input.

10. The computer program product of claim 9, wherein
the plurality of statistical models output a plurality of candidate values for a particular feature,
a value having a highest confidence score is selected, for the particular feature, from the plurality of candidate values, and
the value having the highest confidence score is the one value, for the particular feature, used to create the complex information target.

11. The computer program product of claim 9, wherein the computer-readable storage further comprises:
computer-usable program code that searches the text input for at least one named entity; and
computer-usable program code that determines a value for a feature according to the at least one named entity located within the text input.

12. The computer program product of claim 9, wherein the computer-readable storage further comprises:
computer-usable program code that determines a value for a first feature in the text input; and
computer-usable program code that selects one of the plurality of statistical models based upon the value determined for the first feature.

13. The computer program product of claim 9, wherein the computer-readable storage further comprises:
computer-usable program code that compares the complex information target with a plurality of allowable complex information targets; and
computer-usable program code that determines whether the complex information target is valid according to the comparison with the plurality of allowable complex information targets.

14. The computer program product of claim 13, wherein the computer-readable storage further comprises:
computer-usable program code that selects an alternate value for at least one feature of the complex information target from a plurality of candidate values based upon a confidence score; and
the alternate value conforms to an allowable complex information target.

* * * * *